US007860976B2

(12) United States Patent
Hurtta

(10) Patent No.: US 7,860,976 B2
(45) Date of Patent: Dec. 28, 2010

(54) EMERGENCY SESSION REQUEST HANDLING IN A NETWORK

(75) Inventor: Tuija Hurtta, Espoo (FI)

(73) Assignee: Nokia Corporation, Espoo (FI)

( * ) Notice: Subject to any disclaimer, the term of this patent is extended or adjusted under 35 U.S.C. 154(b) by 969 days.

(21) Appl. No.: 10/502,335

(22) PCT Filed: Jan. 25, 2002

(86) PCT No.: PCT/EP02/00805

§ 371 (c)(1),
(2), (4) Date: Aug. 16, 2004

(87) PCT Pub. No.: WO03/063536

PCT Pub. Date: Jul. 31, 2003

(65) Prior Publication Data

US 2005/0043008 A1 Feb. 24, 2005

(51) Int. Cl.
*G06F 15/16* (2006.01)
*H04M 11/04* (2006.01)

(52) U.S. Cl. .................................... 709/227; 455/404.1

(58) Field of Classification Search ................. 709/227; 455/404.1
See application file for complete search history.

(56) References Cited

U.S. PATENT DOCUMENTS 6,038,440 A * 3/2000 Wu ............................ 455/410
6,249,674 B1 * 6/2001 Verdonk .................. 455/404.1
6,728,208 B1 * 4/2004 Puuskari .................. 370/230.1
6,775,534 B2 * 8/2004 Lindgren et al. ......... 455/404.1
2002/0068545 A1 * 6/2002 Oyama et al. ............... 455/406
2003/0026245 A1 * 2/2003 Ejzak ......................... 370/352
2003/0088676 A1 * 5/2003 Smith et al. ................. 709/227

FOREIGN PATENT DOCUMENTS

| | | |
|---|---|---|
| WO | WO 98/59518 | 12/1998 |
| WO | WO 00/70798 | 11/2000 |
| WO | WO 00/76243 A1 | 12/2000 |
| WO | WO 01/80587 A1 | 10/2001 |

* cited by examiner

*Primary Examiner*—George C Neurauter, Jr.
*Assistant Examiner*—Mark D Fearer
(74) *Attorney, Agent, or Firm*—Mintz, Levin, Cohn, Ferris, Glovsky & Popeo, P.C.

(57) ABSTRACT

The invention provides a method and system for handling a session request of a user equipment in a network comprising at least one supporting entity, in particular in a case where the user equipment is not allowed to initiate other session apart from specific session type. At least one of the supporting entities or another control entity is adapted to check whether or not the initiated session is actually continued as a session of the specific type. The session is forcibly terminated when detecting that it is not continued as such a session. A timer may be started when the user equipment attaches to the network for requesting a session, and the user equipment is detached from the network when not continuing with a session of the specific type within a defined time after attach.

11 Claims, 5 Drawing Sheets

EMERGENCY SESSION REQUEST HANDLING IN A NETWORK

FIELD AND BACKGROUND OF THE INVENTION

The present invention relates to a method and a system for handling emergency sessions in a network, e.g. in a mobile network. In accordance with a more detailed aspect, the invention relates to emergency support for barred or unidentifiable equipments such as a mobile or user equipment (UE).

Emergency sessions have to be supported even in special cases, e.g. for UEs not having a USIM (Universal Subscriber Identity Module), i.e. USIM-less UEs and for UEs which are not allowed to access the network e.g. due to barring. These UEs need to be allowed to access the network but only to setup emergency sessions. These UEs are only allowed to access the network and to activate PDP contexts for IMS (IP Multimedia Subsystem) related signalling (e.g. SIP, DHCP, DNS) and for the actual emergency session (IMS=IP Multimedia Subsystem; PDP=Packet Data Protocol; SIP=Session Initiation Protocol). Every other service should be prohibited by the network.

If the UE then misbehaves and does not setup an emergency session but may even try to setup another session, the network has to be able to detach the UE.

SUMMARY OF THE INVENTION

It is an object of the present invention to solve or alleviate the above problems and to provide for preventing misuse of an e.g. emergency session.

According to the present invention this object is achieved by a method according to any of the independent method claims and/or a system according to any of the independent system claims.

The invention provides a system and method for processing a session setup procedure initiated by an user equipment in a network comprising at least one supporting entity, wherein the user equipment is allowed to initiate sessions of a first type or types and the user equipment is not allowed to initiate sessions of a second type or types. When the user equipment initiates a session, one of the supporting entities or another control entity checks whether or not the initiated session is actually a session of the first type, and the initiated session is terminated, if detecting that it is at least partially a session of the second type.

The session of the first type or one of the first types of sessions may be an emergency session.

The invention further provides a system and method for detaching an user equipment from a network, wherein the user equipment is allowed to initiate sessions of a first type or types and the user equipment is not allowed to initiate sessions of a second type or types. A time check is started when the user equipment attaches to the network for requesting a session of the first type or types, and the user equipment is detached from the network when there is no bearer active for the session within a defined time after the attach.

A supporting entity may be provided to check whether one or more bearers are activated, and/or the session of the first type or types is confirmed, within a defined time after attach, and the supporting entity detaches the user equipment when no activation or confirmation has taken place within the defined time.

The supporting entity preferably includes a timer set to the defined time and being started when the user equipment attaches to the network.

In one of the preferred implementations of the invention, an interface, preferably Go interface, is used to validate whether the session is actually a session of the first type or types.

A control means or function, preferably P-CSCF/PCF, may be adapted to send via the interface an indication whether the session is a session of the first type or types. The indication may be sent when a bearer is authorized against the session, whereas, when the session is a session of the second type or types even if indicated in the bearer parameters, that the initiated session is a session of the first type or types, an entity rejects the bearer activation, or sends to another entity an indication indicating that the session is not a session of the first type or types, the user equipment then being detached from the network. The bearer may be a PDP context.

Detaching the user equipment may be requested via a server in case of detecting that the requested session is a session of the second type. The server can be a Home Subscriber Server (HSS).

A serving function, preferably S-CSCF, may indicate to the server that the user equipment has to be deregistered/detached from the network, the server initiating a detach procedure by sending a message to the supporting entity, such as SGSN.

One of the supporting entities may be adapted to detect whether a user equipment tries to misuse the session of the first type for a session of the second type.

A supporting entity, preferably GGSN, may be adapted to check that the traffic is carried only between the user equipment and the authorized peer, and to drop all other traffic. When the supporting entity drops a packet, it deactivates the PDP context and/or controls the detach of the user equipment.

The network allows an otherwise unauthorized UE, e.g. USIM-less and barred UEs, to access the network but only to use specific services, e.g. to setup specific sessions such as emergency sessions. The network checks that these UEs are not using any other services of the network. If these UEs are trying to fake and use the network for other than specifically allowed servicesn, i.e. are misbehaving, they are detached by the network.

The IMS knows whether a session under setup is actually a specific session such as an emergency session and can indicate this to the PS (Packet-Switched) domain.

This invention proposes several mechanisms in case of misbehaving UEs.

A first implementation is that, if the PDP contexts are not activated (and the emergency session is not confirmed) within a certain time after attach, the supporting entity, e.g. SGSN or MSC, detaches the UE. This requires a timer in the supporting entity;

A second implementation is to use an interface, preferably the Go interface to validate whether the session is actually an allowed session, e.g. an emergency session. A control means or function in the application layer, e.g. P-CSCF/PCF in the IMS, indicates whether the session is an allowed session. This indication can be sent from the control means or function to the PS domain, e.g. to GGSN, when the PDP context is authorized against the session. If the session is not an allowed session even if indicated in the PDP context parameters, an entity, e.g. GGSN, rejects the PDP context activation. The supporting entity, e.g. SGSN, understands from the PDP context rejection that the UE was allowed to access the network just to setup an allowed session and the session is not an allowed session. The supporting entity then detaches the UE.

An alternative solution is to introduce a clear indication between supporting entities, e.g. from GGSN to SGSN, that the session is not an allowed session, i.e. a session of a first type or types (e.g. with a cause code 'requested service incorrect') and thus the UE should, and will, be detached.

A third implementation is to request detaching the UE via a server, e.g. HSS (UMS/HLR). A serving function in the application layer, e.g. S-CSCF in the IMS, indicates to the server in the application layer, e.g. UMS, that the UE has to be deregistered/detached from the network. The server, e.g. UMS, passes this information to the PS domain, e.g. HLR. The HLR initiates the detach procedure by sending a message, e.g. Cancel Location, to the supporting entity, e.g. SGSN.

A further implementation is that the GGSN may know whether the UE misuses the PDP contexts. For example, in case of SIP signaling, the GGSN checks that the traffic is carried only between the UE and the P-CSCF. All other traffic is dropped.

As another example, in case of an emergency session, the GGSN checks that the traffic is carried only between the UE and the EC (EC=Emergency Center) or MGW (MGW=Media Gateway). All other traffic is dopped. If the GGSN drops packets, the UE is misusing the PDP context. The GGSN can thus deactivate the PDP context, and the SGSN can then detach the UE.

The first implementation is able to detect a variety of the misuse cases.

A new cause code in GTP is preferably provided in the second implementation, where it is said that the supporting entity, e.g. SGSN, understands from PDP context rejection, that the UE was allowed to access the network just to establish an allowed session, e.g. an emergency session but the session is not an allowed session. That is rather easy to implement. The Go interface option is one of the preferred implementations since it is specified for the-communication between the IMS and the PS domain. In the Go solution, e.g. the P-CSCF/PCF in the application layer preferably includes an indication whether the session is an allowed session to the decision message which it. sends to the PS domain, e.g. GGSN. This is possible e.g. so that the GGSN includes in its request to the P-CSCF/PCF not only binding information but an indication that the session is claimed to be an allowed session. In that way, the GGSN will ask for authorization of the allowed session. The P-CSCF/PCF then validates whether the session is actually an allowed session. Alternatively, the GGSN does not include any indication in its request. But always the P-CSCF/PCF will check if the GGSN request is about an allowed session and will indicate that to the GGSN. The PCF can receive this information from the P-CSCF and store it per each session or session component. In the latter case, it is only necessary to make a change to COPS decision from the P-CSCF/PCF, without providing any changes to the COPS request from the GGSN. This mechanism is easy to implement.

The invention (e.g. Go alternative) provides an efficient way to eliminate misbehaving UEs.

Further features and advantages of the present invention are defined in the following.

DETAILED DESCRIPTION OF PREFERRED EMBODIMENTS OF THE INVENTION

Figure 1:
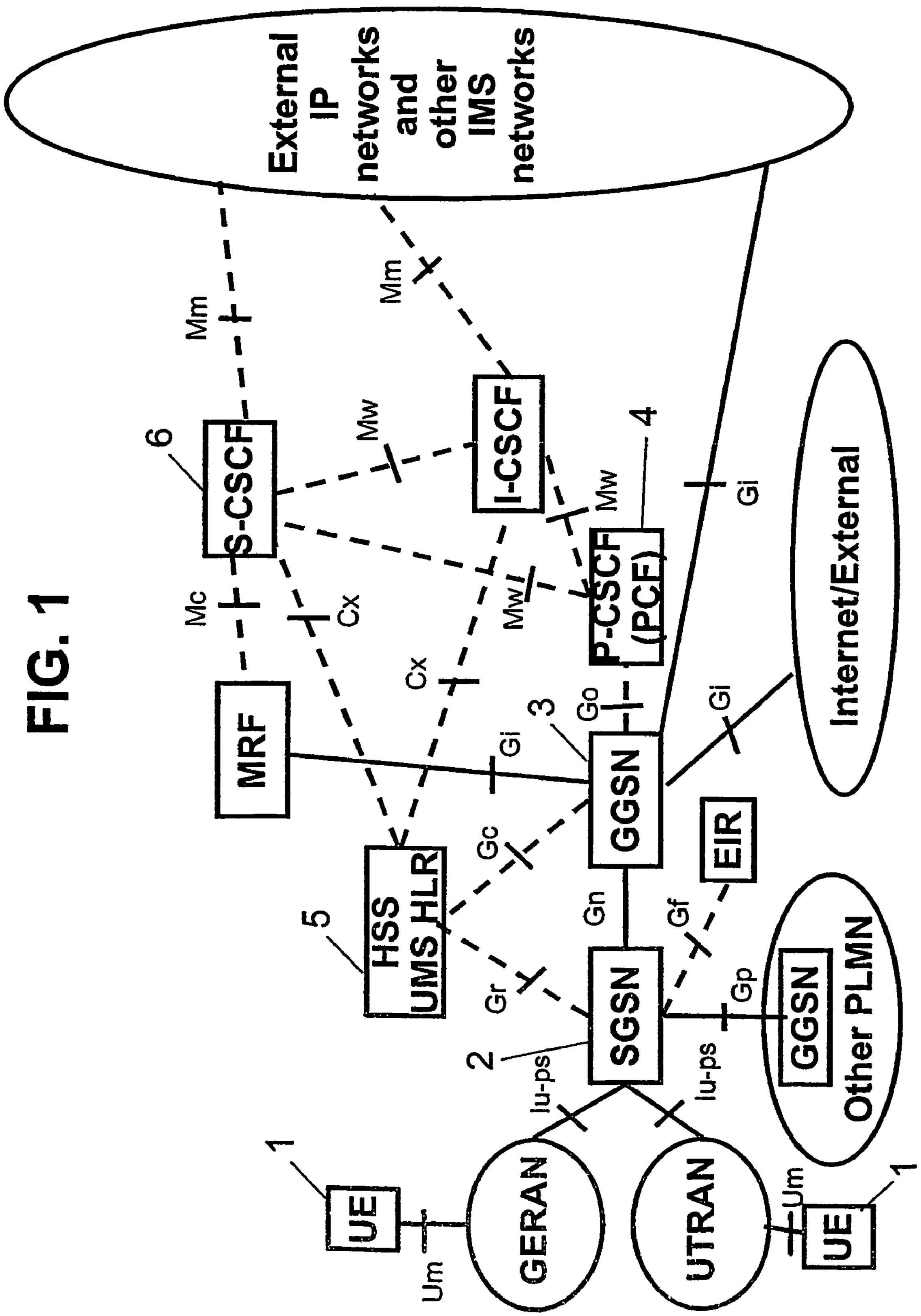
FIG. 1 shows a schematic block diagram illustrating an embodiment of the present invention representing a simplified model for IP Multimedia.

FIG. 1 shows a basic schematic block diagram of an embodiment structure incorporating an implementation. of the present invention (IP Multimedia Subsystem).

The system of FIG. 1 includes one or more, usually a plurality of UEs (or MSs, Mobile Stations) 1, one or more supporting entities 2 such as SGSN 2 (or MSC/VLR), one or more gateway entities such as GGSN 3, a Proxy Call State Control Function (P-CSCF) 4, a Home Subscriber Server (HSS) 5, a Serving Call State Control Function (S-CSCF) 6, and other entities and networks as illustrated in FIG. 1.

As shown in FIG. 1, the P-CSCF 4, or generally a Policy Control Function (PCF), has a protocol interface (Go interface).with the GGSN which supports the transfer of information and policy decisions between a policy decision point (PDP) and a policy enforcement point (PEP) in the GGSN (following COPS framework). The PCF may be co-located with the P-CSCF and is a logical policy decision element which uses standard IP mechanisms to implement Service-based Local Policy in the bearer level, enabling coordination between events in the SIP session level and resource management in the bearer level. The PCF makes policy decisions based on information obtained from the P-CSCF.

Generally, at PDP context activation (PDP—Packet Data Protocol), SGSN 2 and GGSN 3 create a PDP context, containing information about the connection (e.g. IP address, QoS, routing information, etc.). Each subscriber may activate several PDP contexts towards the same or different GGSNs.

This invention proposes several different methods and systems for the case of misbehaving. UEs 1.

Figure 2:
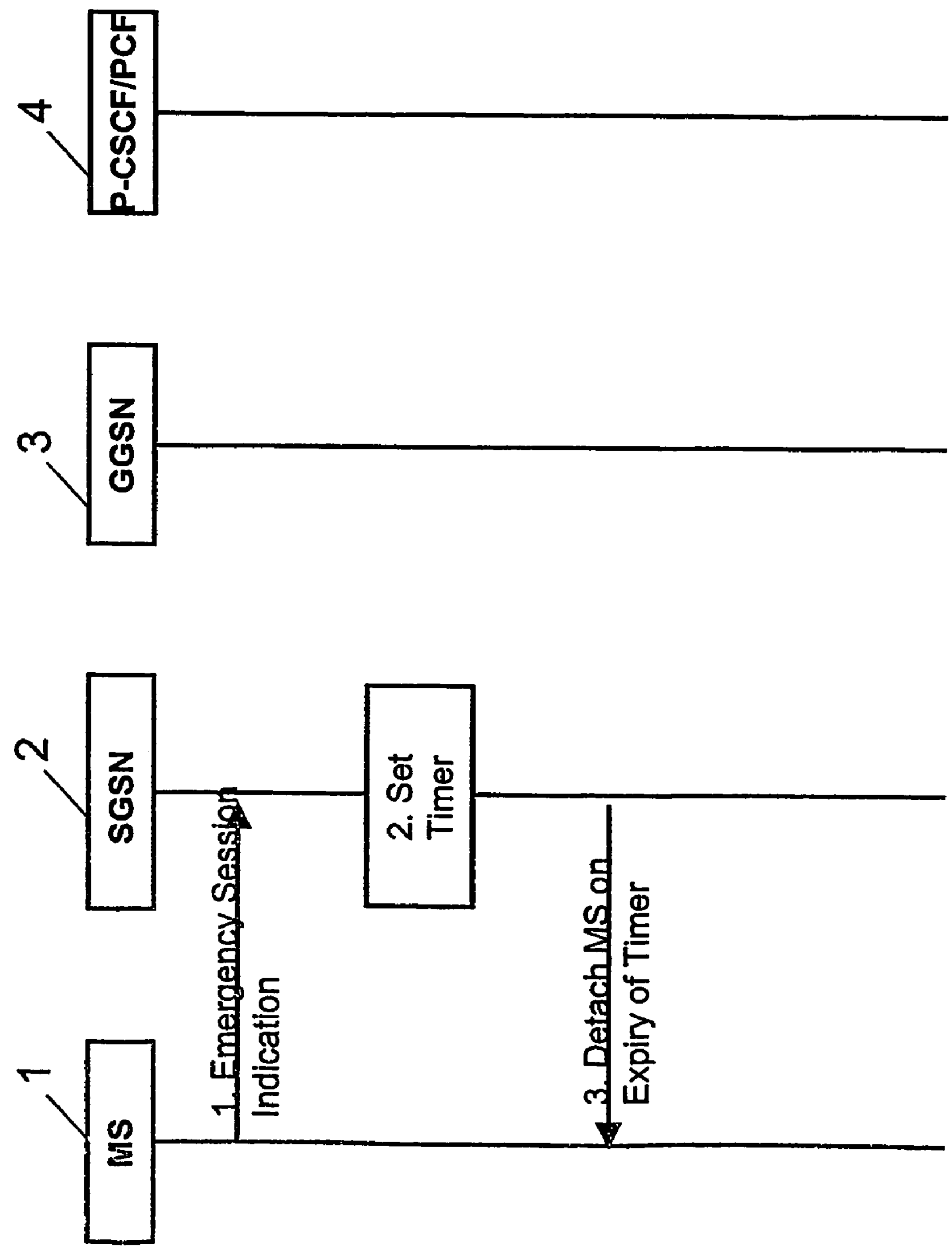
FIG. 2 illustrates an embodiment for automatically detaching an equipment when not proceeding with the emergency session in a certain time.

A first embodiment is shown in FIG. 2. If the PDP contexts are not activated (and/or the emergency session is not confirmed) within a certain time after attach, the SGSN 2 detaches the UE 1. A timer is provided in the SGSN 2.

In detail, when the UE (MS) 1 initiates a procedure to the SGSN 2 in step 1 indicating a request to establish an emergency session, e.g. if the UE initiates attach with an emergency indication or with an emergency IMSI, the SGSN 2 starts an internal timer (step 2) set to an appropriate time interval such as 10 sec, or 30 sec. When the timer expires without PDP contexts having been activated (and/or the emergency session not being confirmed), the SGSN 2 detaches the UE 1 (step 3).

When on the other hand the PDP context activation is initiated and/or the emergency session is confirmed before the expiry time of the timer, the timer is removed and the emergency session is continued in the proper way.

Figure 3:
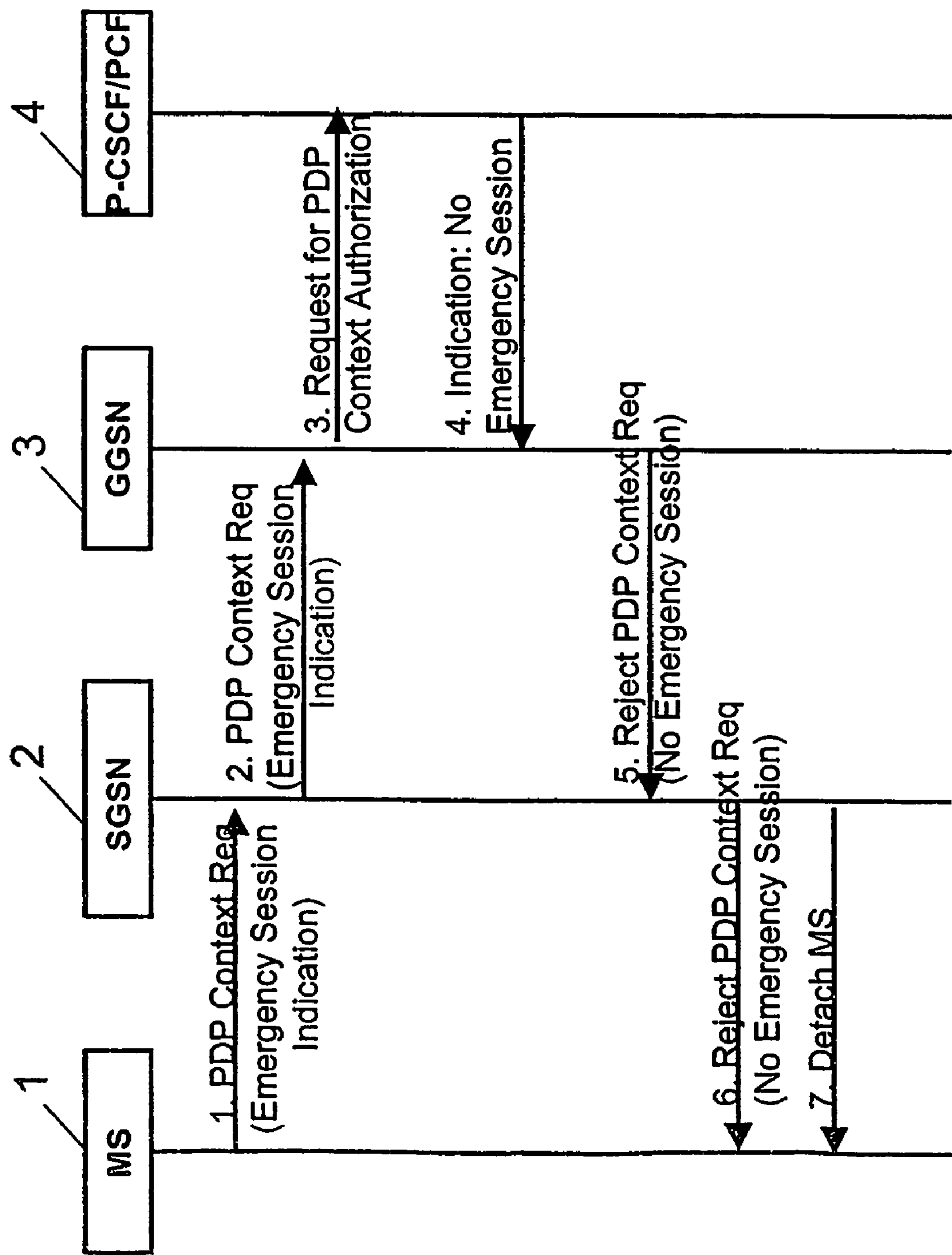
FIG. 3 shows another embodiment for automatically detaching an equipment when not properly proceeding with the emergency session.

FIG. 3 shows another embodiment of the present invention, wherein the Go interface is used to validate whether the session is actually an emergency session. The P-CSCF/PCF 4. indicates whether the session is an emergency session.

This indication can be sent when the PDP context is authorized against the session. If the session is not an emergency session even if indicated in the PDP context parameters, the GGSN 3 rejects the PDP context activation.

The SGSN 2 stores information on otherwise unauthorized UEs and checks if the PDP context is rejected for such a UE. If this is the case, the SGSN 2 understands from the PDP context rejection that the UE 1 was allowed to access the network just to setup an emergency session and the session is not an emergency session. The SGSN 2 thus detaches the UE 1. An alternative solution is to introduce a clear indication from the GGSN 3 to the SGSN 2 that the session is not an emergency session (e.g. with a cause code 'requested service incorrect'),and thus the UE 1 is to be detached. Also in this case, the SGSN 2 stores information on otherwise unauthorized UEs and checks if the PDP context is rejected for such a UE.

In the embodiment of FIG. 3, the emergency session request is indicated from UE (MS) 1 to the SGSN 2, and from SGSN 2 to GGSN 3 in steps 1., 2. ("PDP Context Req (Emergency Session Indication)"). In step 3., the GGSN 3 communicates with the P-CSCF/PCF 4 for continuing with the emergency session, e.g. by requesting PDP context authorization.

In step 4., the P-CSCF/PCF 4 informs the GGSN 3 that the requested session to be handled is not an emergency session (step 4), e.g. by directly sending respective information, or by returning an information to the GGSN 3 e.g. on the type of the actual session requested from which GGSN 3 can conclude that the session is not an emergency session. The GGSN 3 in such a case sends a message to the SGSN 2 (step 5) for causing the SGSN 2 to stop continuing with the requested session. Such a message may e.g. be a "Reject PDP Context Req" message with an indication "No Emergency Session". The SGSN 2 may send this message to the UE 1 (step 6). When receiving such a message, the SGSN 2 bars the UE 1 from continuing with the session, e.g. by detaching it from the network (step 7).

Figure 4:
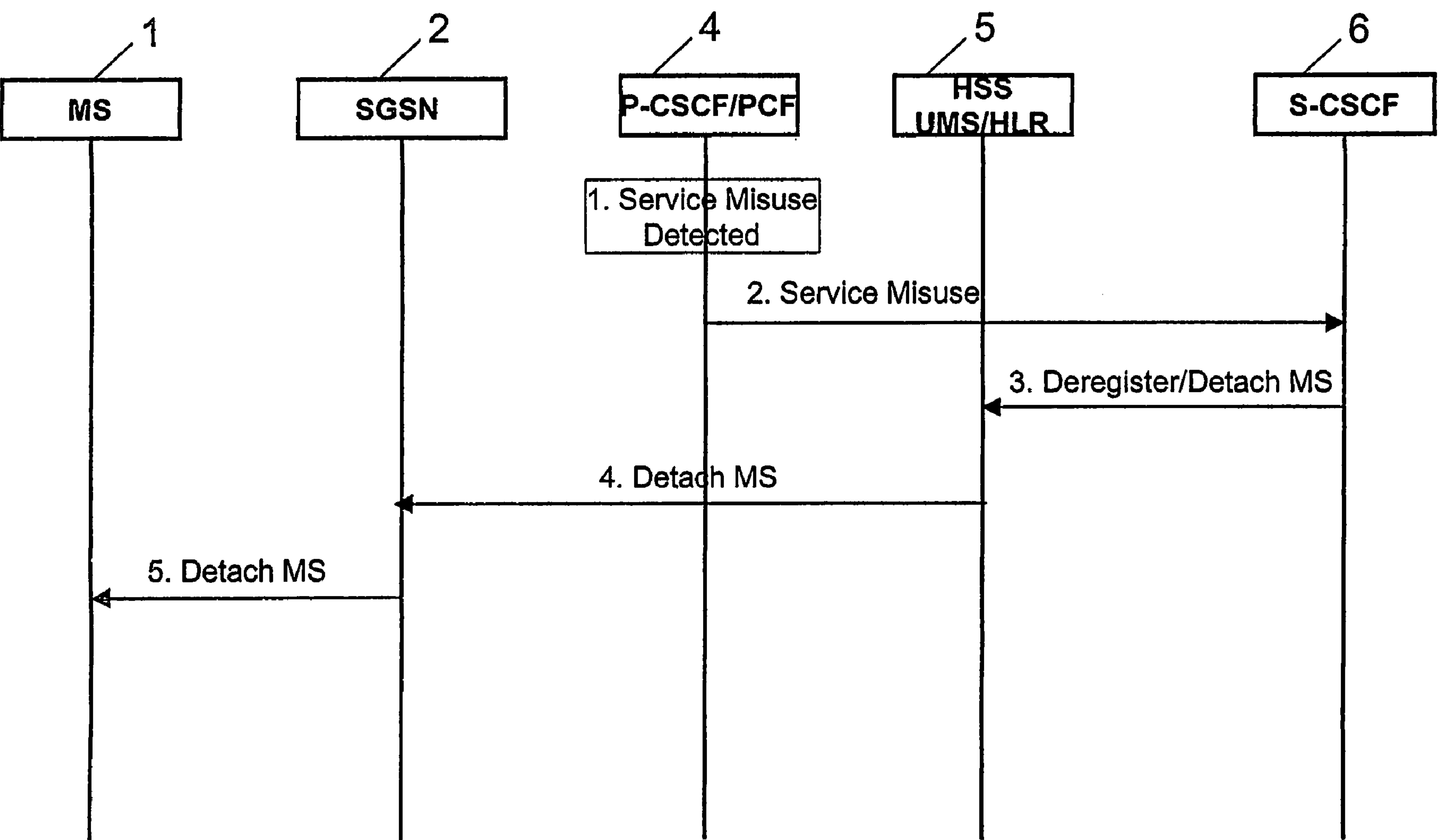
FIG. 4 illustrates a further embodiment for automatically detaching an equipment when not properly proceeding with the emergency session.

FIG. 4 illustrates another embodiment which comprises the feature of requesting detaching the UE (MS) 1 via HSS 5 (UMS/HLR) (HSS=Home Subscriber Server; UMS=User Mobility Server; HLR=Home Location Register).

In the embodiment of FIG. 4, the P-CSCF/PCF detects service misuse in step 1. P-CSCF/PCF may detect service misuse e.g. if an unregistered UE which is allowed to establish only emergency sessions establishes a session which is not an emergency session. Alternatively, the P-CSCF/PCF may detect service misuse when communicating with the GGSN at PDP context activation. The GGSN may receive information that the UE is allowed to establish only emergency sessions from the SGSN and may indicate this to the P-CSCF/PCF. When the P-CSCF/PCF 4 detects service misuse, the P-CSCF/PCF indicates this to the S-CSCF 6 in step 2. The S-CSCF 6 indicates, in a step 3, to the UMS of HSS 5 that the UE 1 has to be deregistered/detached from the network. The UMS passes this information to the HLR. The HLR initiates the detach procedure by sending, in step 4, a message, e.g. "Cancel Location" to the SGSN 2 for instructing the SGSN 2 to detach the UE 1 from the network (step 5). The steps of HLR initiating the detach procedure as such, including step 4, is an existing procedure which is also known as HLR-initiated detach. This procedure is used here as a partial feature in the specific novel context of detecting and blocking a wrongful emergency session request.

Figure 5:
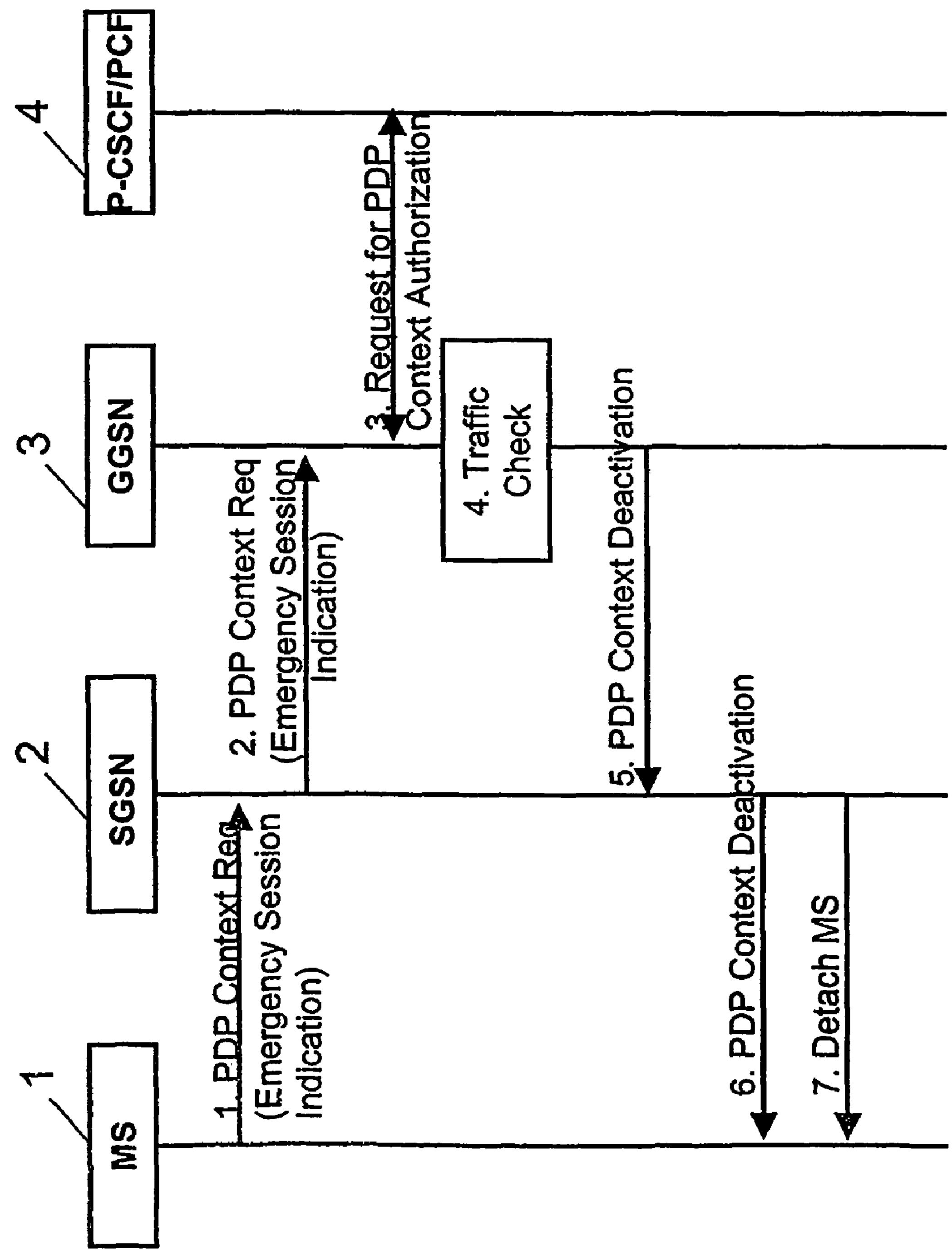
FIG. 5 shows another embodiment for automatically detaching an equipment when not properly proceeding with the emergency session.

A further embodiment is shown in FIG. 5 which involves UE (MS) 1, SGSN 2, GGSN 3, and P-CSCF/PCF 4. In the embodiment of FIG. 5, the emergency session request is indicated from UE (MS) 1 to the SGSN 2, and from SGSN 2 to GGSN 3 in steps 1., 2. ("PDP Context Req (Emergency Session Indication)"). Subsequently, the GGSN 3 communicates with the P-CSCF 4 for authorizing the PDP context, as indicated by the double-headed arrow in step 3.

The PDP context may be used to carry traffic when the PDP context activation is accepted. The GGSN 3 can know and detect whether the UE 1 misuses the PDP contexts by performing a traffic check (step 4). For example, the GGSN 3 checks that the traffic is carried only between the UE 1 and the authorized peer (e.g. the EC or MGW). The GGSN receives information on the authorized peer at PDP context authorization. As another example, the GGSN 3 checks that the traffic is carried only between the UE 1 and the P-CSCF. In the latter example, information on P-CSCF may be configured to the GGSN 3. All other traffic is dropped by the GGSN 3 for allowing only emergency session handling. If the GGSN 3 drops packets, this is an indication that the UE 1 is misusing the PDP context for a non-emergency session. The GGSN 3 can then inform the SGSN 2, e.g. by deactivating the PDP context and/or by indicating the PDP context misuse in step 5. The SGSN 2 may then send this message to the UE 1 (step 6). The SGSN 2 can then detach the UE 1 as indicated in the above embodiments (step 7).

While the invention has been described with reference to preferred embodiments, the description is illustrative of the invention and is not to be construed as limiting the invention. Various modifications and applications may occur to those skilled in the art without departing from the scope of the invention as e.g. defined by the appended claims.

The invention claimed is:

1. A method, comprising:

receiving a session request from a user equipment, wherein the user equipment is permitted to initiate sessions of a first type or types, but not permitted to initiate sessions of a second type or types, the first type or types corresponding to an emergency session, and the second type or types not corresponding to the emergency session;

starting a timer, set to a time interval, upon receiving the session request from the user equipment for a session of the first type or types;

checking whether a bearer is active for the session of the first type or types within said time interval after receiving the session request, the bearer comprising a packet data protocol context; and detaching the user equipment from a network when detecting that there is no bearer active for the session of the first type or types within said time interval after the attachment, wherein the detaching the user equipment is requested via a server when detecting that the requested session is a session of the second type or types.

2. A method according to claim 1, further comprising:

checking, via a supporting entity, whether one or more bearers are activated, and/or the session of the first type or types is confirmed, within a time interval after the attachment, wherein the supporting entity is configured to detach the user equipment when no activation or confirmation has taken place within the time interval.

3. A method according to claim 2, wherein the supporting entity comprises a timer set to the time interval and configured to start timing when the user equipment attaches to the network.

4. A method according to claim 1, wherein the server is a home subscriber server.

5. A method according to claim 1, wherein a serving function indicates to the server that the user equipment has to be deregistered/detached from the network, the server initiating a detach procedure by sending a message to the supporting entity.

6. An apparatus, comprising:

at least one processor; and at least one memory, wherein the at least one processor and the at least one memory provide at least the following:

a timer configured to start a time check of a time interval when a user equipment is attached to a network when requesting a session of a first type or types, the first type or types corresponding to an emergency session, and the second type or types not corresponding to the emergency session; and a controller configured to detach the user equipment from the network when there is no bearer active during the session within the time interval after the attachment of the user equipment, the bearer comprising a packet data protocol context, wherein the apparatus is configured to request detaching the user equipment via a server when detecting that the requested session is a session of the second type or types.

7. An apparatus according to claim 6, wherein the controller is configured to check whether one or more bearers are activated, and/or the session of the first type or types is confirmed, within the time interval after attachment, and wherein the controller is further configured to detach the user equipment when no activation or confirmation has taken place within the time interval.

8. An apparatus according to claim 6, wherein the controller comprises a timer set to the time interval and configured to start timing when the user equipment attaches to the network.

9. An apparatus according to claim 6, wherein the bearer is a packet data protocol context.

10. An apparatus according to claim 6, wherein the server is a home subscriber server.

11. An apparatus according to claim 6, further comprising:

a serving function configured to indicate to the server that the user equipment has to be deregistered/detached from the network, the server being configured to detach the user equipment by sending a message to the controller.

* * * * *